United States Patent
Hammerschmidt et al.

(10) Patent No.: US 10,966,285 B2
(45) Date of Patent: Mar. 30, 2021

(54) SAFETY SWITCH DEVICE FOR A HIGH-VOLTAGE BATTERY OF A MOTOR VEHICLE, HIGH-VOLTAGE BATTERY, ON-BOARD POWER SUPPLY SYSTEM AND MOTOR VEHICLE

(71) Applicant: Bayerische Motoren Werke Aktiengesellschaft, Munich (DE)

(72) Inventors: Thomas Hammerschmidt, Unterschleissheim (DE); Jose Lopez De Arroyabe, Munich (DE); Simon Nuernberger, Bad Aibling (DE); Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/971,794

(22) PCT Filed: Jun. 7, 2019

(86) PCT No.: PCT/EP2019/064980
§ 371 (c)(1),
(2) Date: Aug. 21, 2020

(87) PCT Pub. No.: WO2020/007572
PCT Pub. Date: Jan. 9, 2020

(65) Prior Publication Data
US 2020/0396796 A1    Dec. 17, 2020

(30) Foreign Application Priority Data
Jul. 4, 2018  (DE) ..................... 10 2018 211 007.7

(51) Int. Cl.
*H05B 1/02* (2006.01)
*H01M 10/625* (2014.01)
(Continued)

(52) U.S. Cl.
CPC .............. *H05B 1/0236* (2013.01); *B60L 3/04* (2013.01); *B60L 58/27* (2019.02);
(Continued)

(58) Field of Classification Search
CPC ......... H05B 1/0236; B60L 58/27; B60L 3/04; H01M 10/615; H01M 10/625; H02H 7/18
(Continued)

(56) References Cited

U.S. PATENT DOCUMENTS 6,327,994 B1 *  12/2001  Labrador .............. F03B 13/182
                                                    114/382
9,065,356 B2 *   6/2015  Funato .................. H02M 7/537
(Continued)

FOREIGN PATENT DOCUMENTS

DE    10 2005 061 532 B4    5/2008
DE    10 2015 215 608 A1    3/2016
(Continued)

OTHER PUBLICATIONS

International Search Report (PCT/ISA/210) issued in PCT Application No. PCT/EP2019/064980 dated Oct. 8, 2019 with English translation (four (4) pages).
(Continued)

*Primary Examiner* — M Baye Diao
(74) *Attorney, Agent, or Firm* — Crowell & Moring LLP

(57) ABSTRACT

A safety switch device connects a heating unit for at least one battery cell of a high-voltage battery of a motor vehicle to a power supply connection that provides a heating current for the heating unit. The device includes: a first controllable switching element arranged in a heating current transmission path, which is designed to receive a control signal supplied by a unit external to the high-voltage battery via a signal transmission path of the safety switch device and to generate heating current transmission between the heating unit and
(Continued)

the power supply connection according to the received control signal; a separating unit arranged in the heating current transmission path, for interrupting the heating current transmission in the event of failure of the first switching element; and a transmission unit arranged in the signal transmission path, which is designed to transmit the control signal potential-free to the first switching element, for the galvanic separation of the high-voltage battery and the unit.

9 Claims, 2 Drawing Sheets

(51) Int. Cl.
    *B60L 3/04*          (2006.01)
    *B60L 58/27*        (2019.01)
    *H01M 10/615*     (2014.01)
    *H02H 7/18*         (2006.01)

(52) U.S. Cl.
    CPC ....... *H01M 10/615* (2015.04); *H01M 10/625* (2015.04); *H02H 7/18* (2013.01)

(58) Field of Classification Search
    USPC ........................................................ 219/202
    See application file for complete search history.

(56) References Cited

U.S. PATENT DOCUMENTS

| | | | |
|---|---|---|---|
| 9,095,006 B2 * | 7/2015 | Yue | H05B 3/20 |
| 9,474,027 B2 * | 10/2016 | Prociw | H04W 52/0251 |
| 10,749,430 B2 * | 8/2020 | Gao | H02M 7/42 |
| 2011/0272391 A1 | 11/2011 | Zhu et al. | |
| 2016/0087317 A1 | 3/2016 | Klesyk et al. | |

FOREIGN PATENT DOCUMENTS

| | | | | |
|---|---|---|---|---|
| EP | 2189733 B1 * | 6/2016 | .......... | H05B 1/0202 |
| WO | WO 2007/073951 A1 | 7/2007 | | |

OTHER PUBLICATIONS

German-language Written Opinion (PCT/ISA/237) issued in PCT Application No. PCT/EP2019/064980 dated Oct. 8, 2019 (six (6) pages).

German-language Office Action issued in German Application No. 10 2018 211 007.7 dated Jun. 27, 2019 with English translation (16 pages).

German-language Decision to Grant issued in German Application No. 10 2018 211 007.7 dated Jul. 10, 2019 with English translation (10 pages).

Cover page of EP 1964140 A1 published Sep. 3, 2008 (one (1) page).

"Overcurrent protection device", Wikipedia, May 14, 2018, retrieved from https://de.wikipedia.org/w/index.php?title=%C3%Cberstromschutzeinrichtung&oldid=177419879 with English translation (four (4) pages).

"Galvanic isolation", Wikipedia, Aug. 16, 2017, retrieved from https://de.wikipedia.org/w/index.php?title=Galvanische_Trennung&oldid=168202208 with English translation (ten (10) pages).

* cited by examiner

SAFETY SWITCH DEVICE FOR A HIGH-VOLTAGE BATTERY OF A MOTOR VEHICLE, HIGH-VOLTAGE BATTERY, ON-BOARD POWER SUPPLY SYSTEM AND MOTOR VEHICLE

BACKGROUND AND SUMMARY OF THE INVENTION

The invention relates to a safety switching device for switching a heating unit for heating at least one battery cell of a high-voltage battery of a motor vehicle having a power supply terminal providing a heating current for the heating unit. The invention furthermore relates to a high-voltage on-board power supply, to an on-board power supply system and to a motor vehicle.

What are of interest in this case are high-voltage batteries or high-voltage stores for electrically driveable motor vehicles, in particular electric or hybrid vehicles. Such high-voltage batteries comprise a plurality of battery cells or storage cells that are generally connected so as to form a battery module. In this case, a maximum power able to be provided by the battery module usually drops as the operating temperature of the battery cells drops. In the case of an electrically driveable motor vehicle, this may lead to a situation whereby only limited drive power and limited charging power are available at the start of a journey in the case of low outdoor temperatures. It is therefore known from the prior art to equip the battery modules with a heating unit in order that the battery cells are able to be heated when necessary. By way of example, the heating unit may in this case be driven by an apparatus, external to the high-voltage battery, for heating the battery cells. The apparatus may for example be part of a low-voltage on-board power supply of the motor vehicle.

In this case, predefined safety requirements placed on the motor vehicle make provision for example for the high-voltage battery and the low-voltage on-board power supply to be galvanically isolated from one another. It is thus possible for example to prevent a harmful overvoltage from being transmitted to a body of the motor vehicle via the low-voltage on-board power supply connected to the body in the event of a fault in the high-voltage battery, which overvoltage could injure people. In addition, uncontrolled erroneous heating of the heating unit should be prevented in order to avoid overheating of the battery cells.

The object of the present invention is to make a heating procedure for heating battery cells of a high-voltage battery for an electrically driveable motor vehicle particularly safe.

This object is achieved according to the invention by a safety switching device, a high-voltage battery, an on-board power supply system and a motor vehicle having the features according to the respective independent patent claims. Advantageous embodiments of the invention are the subject matter of the dependent patent claims, the description and the figures.

A safety switching device according to the invention is used to connect a heating unit for heating a battery cell of a high-voltage battery of a motor vehicle to a power supply terminal providing a heating current for the heating unit. The safety switching device has a first controllable switching element, arranged in a heating current transmission path, that is designed to receive a control signal provided by an apparatus external to the high-voltage battery via a signal transmission path of the safety switching device and to provide a transmission of heating current between the heating unit and the power supply terminal in order to heat the battery cells depending on the received control signal. The safety switching device furthermore has a disconnection apparatus, arranged in the heating current transmission path, for interrupting the transmission of heating current in the event of a fault with the first switching element, and a transmission apparatus, arranged in the signal transmission path, that is designed to transmit the control signal without potential to the first switching element in order to galvanically isolate the high-voltage battery and the apparatus.

The invention furthermore relates to a high-voltage battery for a motor vehicle, having at least one battery cell, a heating unit, a power supply terminal and a safety switching device according to the invention, wherein the first controllable switching element is electrically connected to the heating unit and to the power supply terminal and the transmission apparatus is able to be connected to the apparatus external to the high-voltage battery.

The high-voltage battery or the high-voltage accumulator may be, for example, a traction battery for an electrically driveable motor vehicle and have a plurality of battery modules that are connected to one another. The battery modules in turn have a plurality of battery cells that are connected to one another and that may be designed for example as prismatic battery cells. The high-voltage battery furthermore has a heating unit for at least one of the battery cells, in particular for each of the battery cells, of a battery module. The heating unit may for example have a heating film with a heating resistor and that is arranged in or on a cell housing of the respective battery cell. The safety switching device is then used to electrically connect the heating units for heating the battery cells and the power supply terminal to one another in order to start a heating procedure and to disconnect them again in order to end the heating procedure. The power supply terminal may for example be a power supply terminal internal to the high-voltage battery and be formed for example by cell terminals of the battery cell. There may however also be provision for the power supply terminal to be formed by module terminals of a battery module, which module terminals are electrically connected to the cell terminals of the battery cells. In both cases, the heating current for heating the at least one battery cell is provided by the at least one battery cell itself.

The safety switching device or the safety circuit has the heating current transmission path and the signal transmission path. The heating current transmission path comprises the first controllable switching element and the disconnection apparatus. The disconnection apparatus is in particular connected in series with the first switching element. The first switching element may be designed as a semiconductor switch, for example as a power MOSFET. The first switching element may be put into an on state, in which the heating unit and the power supply terminal are electrically connected and in which the transmission of heating current is activated, and into an off state, in which the heating unit and the power supply terminal are disconnected from one another and in which the transmission of heating current is deactivated, by way of the control signal. In order to drive the first switching element, a control terminal of the first switching element is able to be connected to the apparatus external to the high-voltage battery via the signal transmission path. The apparatus may for example be a control apparatus of a low-voltage on-board power supply of the motor vehicle. The apparatus in this case generates the control signal for the first switching element and provides it to the transmission apparatus in the signal transmission path.

The transmission apparatus is designed to forward the control signal to the first switching element with galvanic isolation or without potential. Reference potentials of the apparatus external to the high-voltage battery and of the high-voltage battery are thus isolated from one another. Galvanically isolating the high-voltage battery and the apparatus may prevent an overvoltage from being transmitted to the apparatus in the event of a fault with the high-voltage battery, for example in the case of a short circuit. If the apparatus is part of the low-voltage on-board power supply, it is thus possible to prevent the overvoltage from being transmitted to the low-voltage on-board power supply, whose reference potential is for example the body of the motor vehicle.

In order to heat the battery cells, the control signal is thus for example generated by the apparatus, transmitted without potential to the first switching element by way of the transmission apparatus, as a result of which said switching element is put into the on state and the transmission of heating current is activated or provided. The heating current is then able to be transmitted from the power supply terminal to the heating unit via the first switching element. As soon as the heating procedure is to be ended, the first switching element is put back into the off state and the transmission of heating current is interrupted. In the event of a fault with the first switching element, for example in the case of an alloyed layer forming on the semiconductor switch, this off state is no longer able to be produced and the first switching element remains permanently in the on state. In order still to be able to interrupt the transmission of heating current, the disconnection apparatus is provided. The disconnection apparatus may for example be self-tripping or driveable. The disconnection apparatus is thus able to end the heating process in order to prevent overheating of the battery cells, even in the event of a fault with the first switching element.

As a result of the safety switching device, which makes it possible both to safely interrupt the heating current transmission path and to galvanically isolate the high-voltage battery and the low-voltage on-board power supply, it is possible to provide a particularly safe heating procedure for heating the battery cells.

There may be provision for the disconnection apparatus to have a second controllable switching element, redundant with respect to the first controllable switching element, in the heating current transmission path. The second switching element is arranged in series with the first switching element and may likewise be a semiconductor switch. The semiconductor switches in particular have a current-carrying capacity of up to 150 A and a blocking voltage of 400 V to 800 V. The second switching element is in particular likewise able to be connected to the apparatus via the transmission apparatus, such that the control signal is likewise able to be provided to the second switching element without potential via the signal transmission path. There may be provision in this case for both switching elements to be switched together and therefore synchronously, or to be switched independently or separately from one another. In the event that one of the switching elements is no longer able to be put into the off state, the respective other switching element may be driven so as to interrupt the transmission of heating current.

As an alternative or in addition, the disconnection apparatus has an electric fuse connected in series with the first switching element. The electric fuse or overcurrent protection apparatus may be for example a thermal fuse that interrupts the heating current transmission path for example when the heating current flows via the heating current transmission path for longer than a predefined duration. The duration for which the heating current is allowed to flow from the power supply terminal to the heating unit may be for example between 60 s and 80 s. If a heating current is still flowing after this duration, this is an indication that the first switching element is no longer able to be put into the off state. In order to interrupt the heating procedure, the fuse trips and interrupts the heating current transmission path permanently and thus particularly reliably.

In one development of the invention, the transmission apparatus has at least one optocoupler. The optocoupler is coupled to the first switching element and is able to be coupled to the apparatus external to the high-voltage battery and is designed to transmit the control signal without potential at least to the first switching element. The second switching element may likewise be coupled to the apparatus via the optocoupler or a further optocoupler. There may also be provision for the transmission apparatus to have a DC-to-DC converter with galvanic isolation. The DC-to-DC converter or DC voltage converter may be provided in order to convert the control signal, provided by the apparatus and having a first voltage level, into a control signal having a second voltage level suitable for the first switching element. The voltage is in this case converted without potential, meaning that the DC-to-DC converter may be used both for the voltage conversion and for the galvanic isolation. The DC-to-DC converter may for example have a transformer for the transmission without potential.

In one embodiment of the invention, the signal transmission path of the safety switching device has a timer that is designed to provide the control signal for connecting the heating unit to the power supply terminal only for a predetermined duration for the transmission apparatus. The signal transmission path of the safety switching device in particular has a fuse for interrupting the signal transmission. The fuse and the timer may be connected between the apparatus external to the high-voltage battery and the transmission apparatus. The timer and the fuse may interrupt the signal transmission path, for example in the event of a fault with the apparatus. It is thus for example possible to prevent the control signal from being provided to the first switching element for too long, and thereby transmitting the heating current for too long and consequently overheating the battery cells.

The invention furthermore relates to an on-board power supply system for a motor vehicle, having a high-voltage on-board power supply having a high-voltage battery according to the invention and a low-voltage on-board power supply having an apparatus that is designed to provide the control signal for the first switching element, wherein the high-voltage on-board power supply and the low-voltage on-board power supply are coupled to one another without potential via the transmission apparatus.

A motor vehicle according to the invention comprises an on-board power supply system according to the invention. The motor vehicle is in particular designed as an electric or hybrid vehicle.

The embodiments set forth with regard to the safety switching device according to the invention and its advantages apply analogously to the high-voltage battery according to the invention, to the on-board power supply system according to the invention and to the motor vehicle according to the invention.

Further features of the invention will become apparent from the claims, the figures and the description of the figures. The features and combinations of features mentioned above in the description and the features and combinations of features mentioned below in the description of the figures and/or shown only in the figures are able to be used not only in the respectively specified combination, but also in other combinations or on their own.

The invention is now explained in more detail on the basis of one preferred exemplary embodiment and with reference to the drawings.

BRIEF DESCRIPTION OF THE DRAWINGS

Identical and functionally identical elements are provided with the same reference signs in the figures.

DETAILED DESCRIPTION OF THE DRAWINGS

Figure 1:
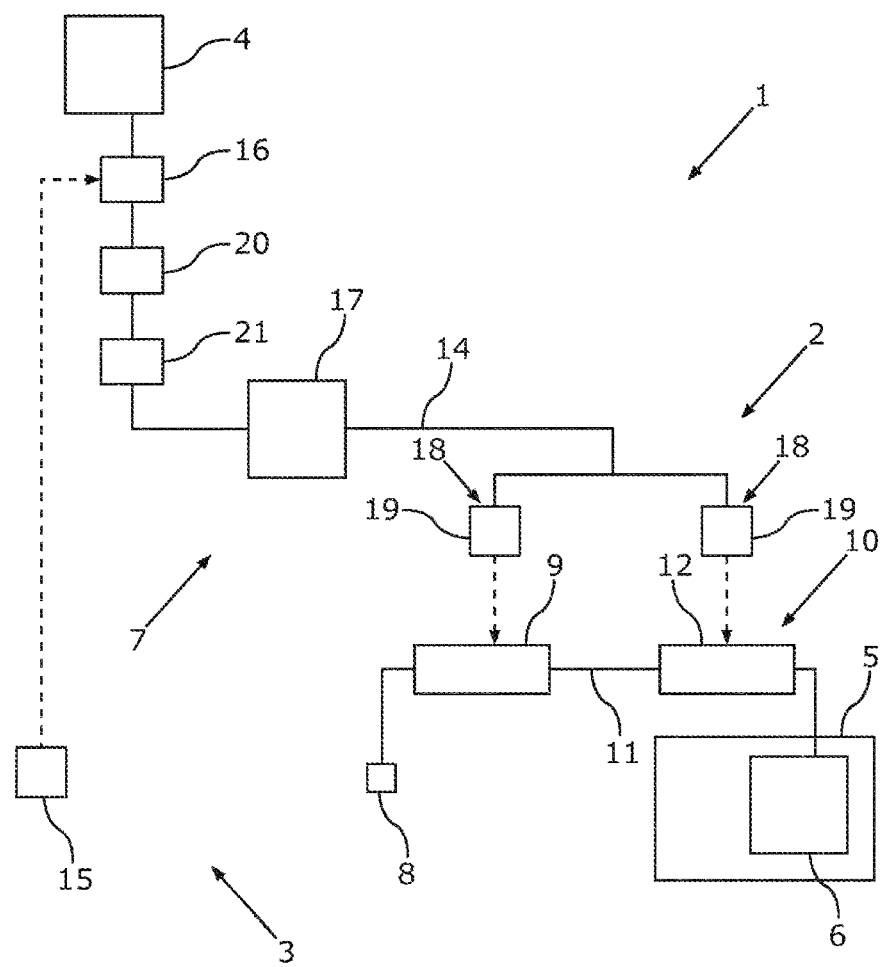
FIG. 1 is a schematic illustration of one embodiment of an on-board power supply system according to the invention.
Figure 2:
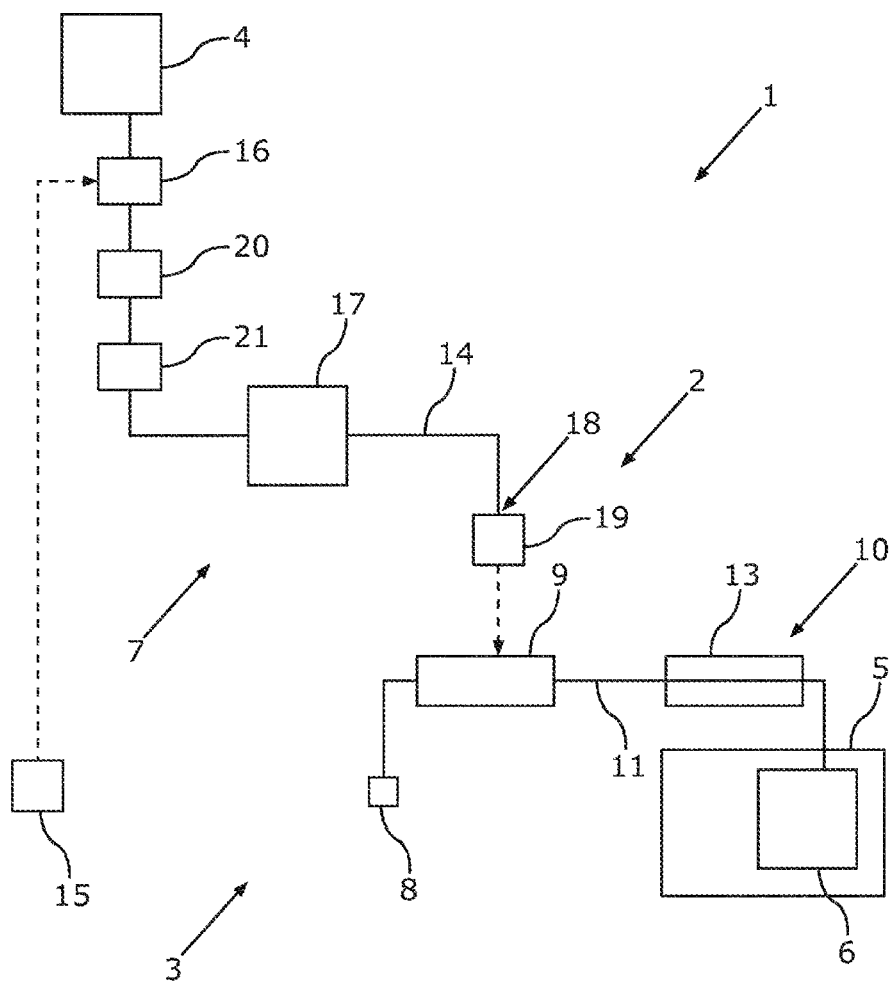
FIG. 2 is a schematic illustration of a second embodiment of an on-board power supply system according to the invention.

FIG. 1 and FIG. 2 show an on-board power supply system 1 for an electrically driveable motor vehicle that is not shown here. The on-board power supply system 1 in this case has a high-voltage on-board power supply 2 having a high-voltage battery 3, and a low-voltage on-board power supply 4. The high-voltage battery 3 may for example be a traction battery for the motor vehicle. The high-voltage battery 3 has a plurality of battery cells 5 connected so as to form battery modules, and at least one heating unit 6 for heating the battery cells 5. The high-voltage battery 3 furthermore has a safety switching device 7 that is designed to electrically connect the heating unit 6 to a power supply terminal 8. The power supply terminal 8 may be formed for example by cell terminals of the battery cells 5 or by module terminals of the battery modules, such that a heating current for the heating unit 6 is provided by the battery cells 5 themselves. The heating unit 6 may thus be designed as a cell self-heater.

The safety switching device 7 in this case comprises a first controllable switching element 9 and a disconnection apparatus 10, wherein the first controllable switching element 9 and the disconnection apparatus 10 are arranged in a heating current transmission path 11. The first controllable switching element 9 is used to provide a transmission of heating current between the power supply terminal 8 and the heating unit 6 when heat is required, and to interrupt it again. The first controllable switching element 9 may be for example a semiconductor switch in the form of a power MOSFET. The disconnection apparatus 10 is used to still interrupt or disconnect the transmission of heating current in the event of a fault with the first switching element 9, for example in the event of an alloyed layer forming on the semiconductor switch. It is thereby possible to prevent the battery cells 5 from continuing to be heated and thereby potentially overheating. The disconnection apparatus 10 according to FIG. 1 is in particular formed by a second controllable switching element 12 that is connected in series with the first switching element 9 and is therefore designed to be redundant with respect to the first switching element 9. According to FIG. 2, the disconnection apparatus 10 is formed by a fuse 13, for example a thermal fuse, that interrupts the transmission of heating current if the heating current flows for longer than a predetermined duration, for example 60 s to 80 s, from the power supply terminal 8 to the heating unit 6.

The first controllable switching element 9 and possibly the second controllable switching element 12 are coupled to the low-voltage on-board power supply 4 via a signal transmission path 14. The low-voltage on-board power supply 4 has an apparatus external to the high-voltage battery, which apparatus provides a control signal for the controllable switching element(s) 9, 12. The apparatus may for example be a supply terminal in the low-voltage on-board power supply 4. By way of example, the control signal may be provided in the high-voltage on-board power supply 2 whenever a control apparatus 15, when heat is needed, closes a switching apparatus 16, for example a contactor, by way of which the high-voltage on-board power supply 2 and the low-voltage on-board power supply 4 are able to be coupled to one another. The control apparatus 15 may for example be a battery controller or battery management system of the high-voltage battery 3. The control signal is in this case transmitted to a transmission apparatus 18 in the signal transmission path 14 by a DC-to-DC converter 17 arranged in the signal transmission path 14. The transmission apparatus 18 is used to transmit the control signal without potential to the controllable switching element(s) 9, 12. The high-voltage on-board power supply 2 and the low-voltage on-board power supply 4 are galvanically isolated by the transmission apparatus 18.

The transmission apparatus 18 may for example have at least one optocoupler 19. In the case of FIG. 1, the transmission apparatus 18 has a first optocoupler 19 for the first switching element 9 and a second optocoupler 19 for the second switching element 12. The switching elements 9, 12 are thus able to be switched separately from one another or individually. According to FIG. 2, only the first switching element 9 is driven via the optocoupler 19, since the fuse 13 is designed to be self-tripping. In the event that the DC-to-DC converter 17 is designed for voltage conversion without potential, said DC-to-DC converter may also form the transmission apparatus 18.

In this case, a fuse 20 and a timer 21 are furthermore arranged in the signal transmission path 14. The fuse 20 is used to interrupt the transmission of a signal from the low-voltage on-board power supply 4 to the transmission apparatus 18 if a control current flowing through the fuse 20 exceeds a predetermined current strength for a predetermined duration. The timer 21 is designed to provide the control signal for the first switching element 9 (and possibly the second switching element 12) only for a certain duration. According to FIG. 2, it is thus possible to prevent the fuse 13 from tripping, for example if, due to a malfunction with the controller 15, the heating procedure is not interrupted and the control signal continues to be generated.

LIST OF REFERENCE SIGNS

1 On-board power supply system
2 High-voltage on-board power supply
3 High-voltage battery
4 Low-voltage on-board power supply
5 Battery cell
6 Heating unit
7 Safety switching device
8 Power supply terminal
9 First switching element
10 Disconnection apparatus
11 Heating current transmission path
12 Second switching element
13 Fuse
14 Signal transmission path
15 Control apparatus
16 Switching apparatus
17 DC-to-DC converter
18 Transmission apparatus
19 Optocoupler
20 Fuse
21 Timer

What is claimed is:

1. A safety switching device for connecting a heating unit for heating at least one battery cell of a high-voltage battery of a motor vehicle to a power supply terminal providing a heating current for the heating unit, comprising:
   a first controllable switching element, arranged in a heating current transmission path, that is designed to receive a control signal provided by an apparatus external to the high-voltage battery via a signal transmission path of the safety switching device and to provide a transmission of heating current between the heating unit and the power supply terminal in order to heat the battery cells depending on the received control signal;
   a disconnection apparatus, arranged in the heating current transmission path, for interrupting the transmission of heating current in the event of a fault with the first switching element;
   a transmission apparatus, arranged in the signal transmission path, that is designed to transmit the control signal without potential to the first switching element in order to galvanically isolate the high-voltage battery and the heating unit, wherein
   the signal transmission path of the safety switching device has a timer that is designed to provide the control signal for connecting the heating unit to the power supply terminal only for a predetermined duration.

2. The safety switching device according to claim 1, wherein
   the disconnection apparatus has a second controllable switching element, redundant with respect to the first controllable switching element, in the heating current transmission path.

3. The safety switching device according to claim 1, wherein
   the disconnection apparatus has an electric fuse in series with the first switching element in the heating current transmission path.

4. The safety switching device according to claim 1, wherein
   the transmission apparatus has at least one optocoupler.

5. The safety switching device according to claim 1, wherein
   the transmission apparatus has a DC-to-DC converter with galvanic isolation.

6. The safety switching device according to claim 1, wherein
   the signal transmission path of the safety switching device has a fuse for interrupting the signal transmission.

7. A high-voltage battery for a motor vehicle, comprising:
   at least one battery cell;
   a heating unit;
   a power supply terminal; and
   a safety switching device according to claim 1, wherein
   the first controllable switching element is electrically connected to the heating unit and to the power supply terminal and the transmission apparatus is able to be connected to the apparatus external to the high-voltage battery.

8. An on-board power supply system for a motor vehicle, comprising:
   a high-voltage on-board power supply according to claim 7 including a high-voltage battery; and
   a low-voltage on-board power supply having an apparatus that is designed to provide the control signal for the first switching element, wherein
   the high-voltage on-board power supply and the low-voltage on-board power supply are coupled without potential via the transmission apparatus.

9. A motor vehicle comprising an on-board power supply system according to claim 8.

* * * * *